United States Defensive Publication [19] (H) [11] T971,004

Dunn [43] June 6, 1978

[54] FOAM PLASTICS

[75] Inventor: Colin Malcolm Roy Dunn, Biggleswade, England

[73] Assignee: Imperial Chemical Industries Limited, London, England

[21] Appl. No.: 822,910

[22] Filed: Aug. 8, 1977

[30] Foreign Application Priority Data

Sep. 6, 1976 United Kingdom ..... 36820/76

[51] Int. Cl.[2] ..... B29D 27/00

[52] U.S. Cl. ..... 264/53; 264/45.5; 264/DIG. 5

[57] ABSTRACT

A process for the manufacture of a foamed thermoplastic aromatic polyethersulphone comprising heating a solid thermoplastic composition comprising an aromatic polyethersulphone which is not in admixture with another type of thermoplastic polymer, said composition containing 0.25 to 20% by weight of an absorbed volatile liquid selected from water, acetone, ethyl acetate, methyl ethyl ketone, methylene chloride and chloroform, to a temperature above (Tg-50)° C where Tg is the glass/rubber transition temperature of the thermoplastic polyethersulphone.

Preferably the thermoplastic composition contains 0.5 to 20% and particularly 1 to 20% by weight, of the absorbed volatile liquid.

The solid thermoplastic composition may be in the form of a powder or granules so as to produce a foamed puff-ball type of structure or it may be in the form of a shaped article such as a sheet, film, coating, moulding or extrusion so as to produce a foamed shaped article. The heating may be effected using an air oven, a microwave oven or by immersion of the composition in the form of a shaped article in a fluidized bed or bath of a suitable material heated to the desired temperature.

The volatile liquid may be incorporated into the composition by exposing the polyethersulphone to an atmosphere of the liquid and more particularly by immersing the polyethersulphone in the volatile liquid. Where the volatile liquid has a solvent affinity for the polyethersulphone, granules or powder soaked in the liquid may flow together to form a product which becomes a foamable solid after the excess volatile liquid has been allowed to evaporate.

Examples of polyethersulphones employed in the foaming process have the repeat units

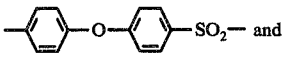

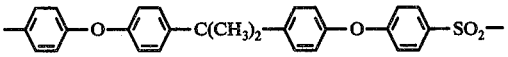

10 Claims, No Sheets Drawing,

12 Pages Specification

The file of this unexamined application may be inspected and copies thereof may be purchased (849 O.G. 1221, Apr. 9, 1968).